United States Patent
Boles et al.

(10) Patent No.: US 11,132,369 B2
(45) Date of Patent: Sep. 28, 2021

(54) OPTIMIZING USER ENGAGEMENT WITH CONTENT BASED ON AN OPTIMAL SET OF ATTRIBUTES FOR MEDIA INCLUDED IN THE CONTENT

(71) Applicant: Facebook, Inc., Menlo Park, CA (US)

(72) Inventors: Elizabeth Patton Boles, San Francisco, CA (US); Yining Wu, Sunnyvale, CA (US); Cassidy Jake Beeve-Morris, San Francisco, CA (US); Chin Lung Fong, Foster City, CA (US)

(73) Assignee: Facebook, Inc., Menlo Park, CA (US)

( * ) Notice: Subject to any disclaimer, the term of this patent is extended or adjusted under 35 U.S.C. 154(b) by 197 days.

(21) Appl. No.: 16/051,486

(22) Filed: Aug. 1, 2018

(65) Prior Publication Data
US 2020/0042610 A1 Feb. 6, 2020

(51) Int. Cl.
*G06Q 30/00* (2012.01)
*G06F 16/2457* (2019.01)
*G06N 20/00* (2019.01)
*G06N 3/08* (2006.01)
*G06Q 30/08* (2012.01)
*H04N 1/60* (2006.01)
*H04N 5/232* (2006.01)

(52) U.S. Cl.
CPC ......... *G06F 16/24578* (2019.01); *G06N 3/08* (2013.01); *G06N 20/00* (2019.01); *G06Q 30/08* (2013.01); *H04N 1/6027* (2013.01); *H04N 5/23238* (2013.01)

(58) Field of Classification Search
None
See application file for complete search history.

(56) References Cited

U.S. PATENT DOCUMENTS

| 2011/0010239 | A1* | 1/2011 | Vijay | ............... G06Q 30/0243 705/14.42 |
| 2011/0313845 | A1* | 12/2011 | Richardson | ........ G06Q 30/0244 705/14.42 |

(Continued)

OTHER PUBLICATIONS

"Artificial neural network" Jul. 31, 2018, Wikipedia, p. 11 (Year: 2018).*

(Continued)

*Primary Examiner* — Meredith A Long
(74) *Attorney, Agent, or Firm* — Fenwick & West LLP

(57) ABSTRACT

An online system identifies a candidate content item eligible for presentation to a viewing user of the online system, in which the candidate content item includes media (e.g., an image, a video, etc.). The online system identifies one or more media attributes for the media, such as color saturation, tone, brightness, sharpness, contrast, etc. The online system also predicts a value of a performance metric for the candidate content item that indicates a likelihood of user engagement with the candidate content item by the viewing user. For each modification that may be made to a media attribute, the online system predicts a change to the value of the performance metric. Based on the predicted change, the online system determines an optimal set of media attributes associated with a maximum predicted value of the performance metric. The online system modifies the media based on the optimal set of media attributes.

26 Claims, 3 Drawing Sheets

| Modification(s) to Media Attribute(s) 405 |
|---|
| Brightness + 10 |
| Brightness + 5 |
| Brightness +/- 0 |
| Brightness - 5 |
| Brightness - 10 |

| Predicted Value of Performance Metric 430 |
|---|
| CTR 1 |
| CTR 2 |
| CTR 3 |
| CTR 4 |
| CTR 5 |

(56) References Cited

U.S. PATENT DOCUMENTS

| | | | | |
|---|---|---|---|---|
| 2014/0019261 A1* | 1/2014 | Hegeman | ............... | G06Q 50/01 705/14.71 |
| 2016/0247044 A1* | 8/2016 | Shen | ................... | H04N 5/2257 |
| 2018/0012131 A1 | 1/2018 | Tseng | | |
| 2018/0096382 A1* | 4/2018 | Maughan | ........... | G06Q 30/0246 |
| 2018/0121953 A1 | 5/2018 | Zhang et al. | | |
| 2019/0228439 A1* | 7/2019 | Anthony | ............ | G06Q 30/0202 |
| 2019/0370851 A1* | 12/2019 | Haddadnia | ......... | G06Q 30/0244 |

OTHER PUBLICATIONS

PCT International Search Report and Written Opinion, PCT Application No. PCT/US2019/044115, dated Sep. 18, 2019, 12 pages.
Suran, S. et al. "Automatic Aesthetic Quality Assessment of Photographic Images Using Deep Convolutional Neural Network." 2016 International Conference on Information Science (ICIS), Aug. 12-13, 2016, pp. 77-82.

\* cited by examiner

OPTIMIZING USER ENGAGEMENT WITH CONTENT BASED ON AN OPTIMAL SET OF ATTRIBUTES FOR MEDIA INCLUDED IN THE CONTENT

BACKGROUND

This disclosure relates generally to online systems, and more specifically to optimizing user engagement with content based on an optimal set of attributes for media included in the content.

An online system allows its users to connect and communicate with other online system users. Users create profiles in the online system that are tied to their identities and include information about the users, such as interests and demographic information. The users may be individuals or entities such as corporations or charities. Because of the popularity of online systems and the significant amount of user-specific information maintained in online systems, an online system provides an ideal forum for allowing users to share content by creating content items for presentation to additional online system users. For example, users may share photos or videos they have uploaded by creating content items that include the photos or videos that are presented to additional users to whom they are connected in the online system.

To maximize user engagement with online systems, online systems may select content items for presentation to online system users with which the users are likely to engage based on information associated with the content items (e.g., targeting criteria associated with the content items, tags associated with the content items, etc.) and information associated with the users (e.g., user profile information, information describing actions previously performed by the users, etc.). For example, targeting criteria associated with a content item may be provided by a content-providing user of an online system that specify one or more attributes for online system users who are likely to have an interest in the content item. In this example, upon identifying an opportunity to present content to a viewing user of the online system, the online system may identify the content item as being eligible to be presented to the viewing user if the viewing user is associated with user profile information satisfying at least one of the targeting criteria. Continuing with this example, the online system may identify additional content items that are eligible to be presented to the viewing user and select one or more content items for presentation to the viewing user.

In some instances, online systems may increase user engagement with content items selected for presentation to online system users if media (e.g., images, videos, 360-degree images or videos, renderings in virtual or augmented reality, etc.) included in the content items are modified. For example, suppose that a content item includes a dark and blurry image of a landscape. In this example, the content item may be more appealing if the image were modified by sharpening the image by 5% and by brightening the image by 12%, which may result in more user engagement with the content item. However, it may be difficult or impractical for online systems to determine how media included in content items should be modified to optimize user engagement with the content items. In the above example, the online system may be unable to determine how the image should be modified in order to optimize user engagement with the content item without obtaining feedback from users about the image (e.g., via surveys or questionnaires) prior to sending the content item for display to the users. Furthermore, a content item may be more appealing to different online system users based on different types and/or combinations of modifications that may be made to media included in the content item. In the above example, some online system users may find the content item even more appealing if modifications also are made to the color saturation and/or the tone of the image while other users may not.

SUMMARY

Conventionally, to encourage user engagement with online systems, online systems select content items for presentation to online system users with which the users are likely to engage based on information associated with the content items and information associated with the users. Furthermore, online systems may increase user engagement with content items selected for presentation to online system users if media included in the content items are modified. However, it may be difficult or impractical for online systems to determine how media included in content items should be modified to optimize user engagement with the content items.

Therefore, an online system optimizes user engagement with content presented to users of the online system based on an optimal set of attributes for media included in the content. To select one or more content items (e.g., advertisements) for presentation to a viewing user of the online system, upon identifying an opportunity to present content to the viewing user, the online system identifies one or more candidate content items eligible to be presented to the viewing user, in which each of the candidate content items includes one or more items of media (e.g., an image, a video, a 360-degree image or video, a rendering in virtual or augmented reality, etc.). For each candidate content item identified by the online system, the online system identifies one or more attributes for media included in the candidate content item ("media attributes"), such as color saturation, tone, brightness, sharpness, contrast, etc. The online system also predicts a value of a performance metric for the candidate content item that indicates a likelihood of user engagement with the candidate content item by the viewing user (e.g., a click-through rate (CTR) performance metric). For each modification that may be made to the media attribute(s), the online system predicts a change to the value of the performance metric and determines an optimal set of media attributes associated with a maximum predicted value of the performance metric. The online system modifies media included in the candidate content item based on the optimal set of media attributes associated with the maximum predicted value of the performance metric.

Furthermore, once the online system has modified the media included in the candidate content item, the online system may then rank the candidate content item including the modified media for presentation to the viewing user among one or more additional candidate content items based on the maximum predicted value of the performance metric. The online system then selects one or more content items for presentation to the viewing user based on the ranking (e.g., by selecting one or more of the highest ranked content items for presentation to the viewing user). The selected content item(s) subsequently may be sent for presentation to the viewing user (e.g., in a user interface generated by the online system that includes a feed of content items).

In some embodiments, the online system may predict a value of a performance metric for a candidate content item and/or a change to a value of the performance metric using a machine-learning model. In such embodiments, the machine-learning model may be trained based on information associated with content items previously presented to viewing users of the online system (e.g., a call to action associated with each content item, a content of each content item, etc.), media included in the content items, media attributes for the media, user attributes for the viewing users, values of performance metrics associated with previous presentations of content to the viewing users, etc. Furthermore, in such embodiments, the online system may train the machine-learning model (e.g., a convolutional neural network that analyzes media).

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
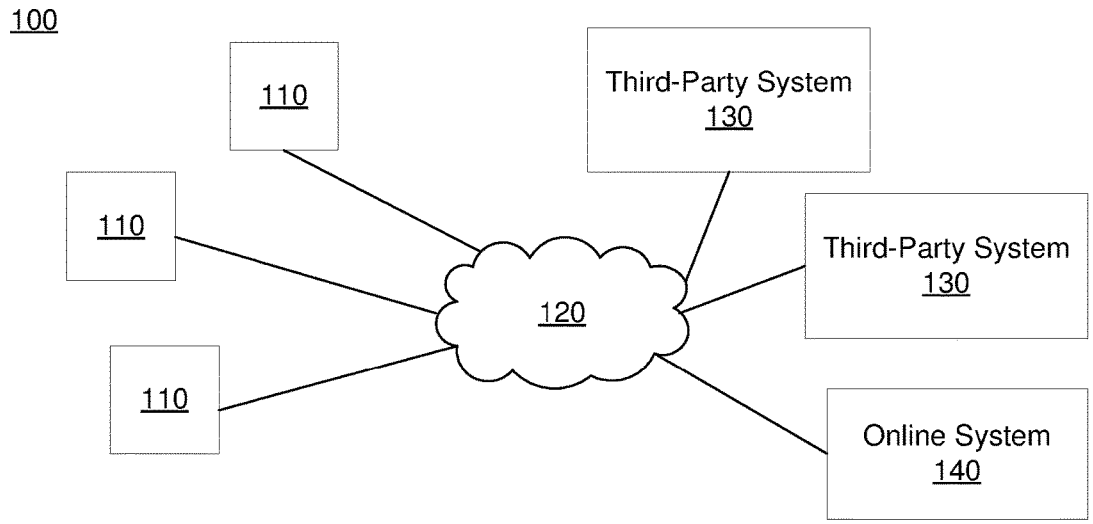
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 provides content or other information for presentation via a client device 110. A third-party system 130 also may communicate information to the online system 140, such as advertisements, content, or information about an application provided by the third-party system 130.

Figure 2:
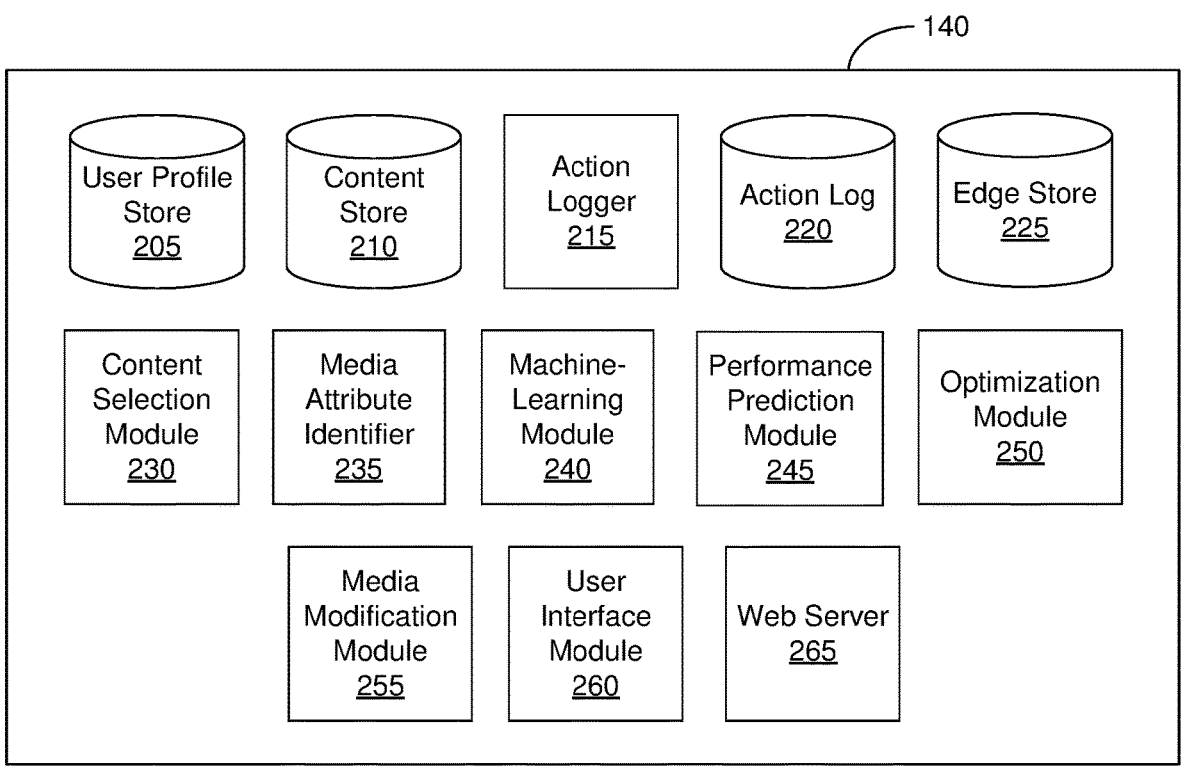
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, a media attribute identifier 235, a machine-learning module 240, a performance prediction module 245, an optimization module 250, a media modification module 255, a user interface module 260, and a web server 265. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more user attributes for the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image. A user profile in the user profile store 205 also may maintain references to actions by the corresponding user performed on content items in the content store 210 and stored in the action log 220.

While user profiles in the user profile store 205 are frequently associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010 (U.S. Publication No. US 2012/0166532 A1, published on Jun. 28, 2012), U.S. patent application Ser. No. 13/690, 254 (U.S. Pat. No. 9,070,141, issued on Jun. 30, 2015), filed on Nov. 30, 2012, U.S. patent application Ser. No. 13/689, 969, filed on Nov. 30, 2012 (U.S. Pat. No. 9,317,812, issued on Apr. 19, 2016), and U.S. patent application Ser. No. 13/690,088, filed on Nov. 30, 2012 (U.S. Publication No. US 2014/0156360 A1, published on Jun. 5, 2014), each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 identifies (e.g., as shown in step 310 of FIG. 3) candidate content items eligible for presentation to a viewing user of the online system 140. Candidate content items are retrieved from the content store 210 or from another source by the content selection module 230. A candidate content item is a content item associated with at least a threshold number of targeting criteria satisfied by characteristics of a viewing user or is a content item that is not associated with targeting criteria. In some embodiments, the content selection module 230 may identify candidate content items that include media (e.g., images, videos, 360-degree images or videos, renderings in virtual or augmented reality, etc.). In such embodiments, the candidate content items may be identified based on metadata associated with each candidate content item indicating that it includes content having a particular media file format (e.g., JPEG, TIFF, PNG, MOV, AVI, MP4, FLV, WMV, VRML, etc.). The content selection module 230 also may identify candidate content items including media using a machine-learning model (e.g., a convolutional neural network) trained to identify media within the candidate content items or using any other suitable technique. In embodiments in which the content selection module 230 identifies candidate content items including media using a machine-learning model, the content selection module 230 also may use the model to identify components of the media (e.g., a logo, a flag, a trademark, an emblem, an icon, etc. included in the media).

In various embodiments, the content selection module 230 ranks (e.g., as shown in step 345 of FIG. 3) and selects (e.g., as shown in step 350 of FIG. 3) candidate content items for presentation to a viewing user. In some embodiments, the content selection module 230 may do so using one or more selection processes. For example, the content selection module 230 determines measures of relevance of various candidate content items to a viewing user based on characteristics associated with the viewing user and based on the viewing user's affinity for different content items. In this example, based on the measures of relevance, the content selection module 230 selects candidate content items for presentation to the viewing user (e.g., by selecting candidate content items having the highest measures of relevance or having at least a threshold measure of relevance for presentation to the viewing user). Alternatively, in the above example, the content selection module 230 may rank the candidate content items based on their associated measures of relevance and select candidate content items having the highest positions in the ranking or having at least a threshold position in the ranking for presentation to the viewing user.

Candidate content items selected for presentation to a viewing user may include advertisements or other candidate content items associated with bid amounts. The content selection module 230 may use the bid amounts associated with such candidate content items when selecting content for presentation to the viewing user. In various embodiments, the content selection module 230 determines an expected value associated with various candidate content items based on their bid amounts and selects candidate content items associated with a maximum expected value or associated with at least a threshold expected value for presentation to a viewing user. An expected value associated with a candidate content item represents an expected amount of compensation to the online system 140 for presenting the candidate content item. For example, the expected value associated with a candidate content item corresponding to an advertisement is a product of a bid amount associated with the advertisement and a likelihood that a viewing user will interact with the advertisement. The content selection module 230 may rank candidate content items based on their associated bid amounts and select candidate content items having at least a threshold position in the ranking for presentation to a viewing user. In some embodiments, the content selection module 230 ranks both candidate content items that are not associated with bid amounts and candidate content items that are associated with bid amounts (e.g., advertisements) in a unified ranking (e.g., based on bid amounts associated with advertisements and measures of relevance associated with all candidate content items). In such embodiments, based on the unified ranking, the content selection module 230 may select content for presentation to a viewing user. Selecting advertisements and other candidate content items through a unified ranking is further described in U.S. patent application Ser. No. 13/545,266, filed on Jul. 10, 2012 (U.S. Publication No. US 2014/0019261 A1, published on Jan. 16, 2014), which is hereby incorporated by reference in its entirety.

In embodiments in which the content selection module 230 identifies candidate content items including media, one or more candidate content items ranked by the content selection module 230 for presentation to a viewing user of the online system 140 may include media modified based on an optimal set of media attributes for the media. In such embodiments, the content selection module 230 may rank each candidate content item based on a maximum predicted value of a performance metric associated with the optimal set of media attributes. For example, if a set of candidate content items includes one or more items of media that have been modified by the media modification module 255 (described below), the content selection module 230 may rank the candidate content items based on a maximum predicted value of a performance metric associated with an optimal set of media attributes for each item of media included in the candidate content item(s). In this example, a highest ranked candidate content item is associated with a highest performance metric, a second highest ranked candidate content item is associated with a second highest performance metric, etc. In some embodiments, the content selection module 230 also may rank candidate content items including modified media for presentation to a viewing user based on additional factors (e.g., a bid amount associated with the candidate content items, a measure of relevance associated with the candidate content items, etc.). As described above, the content selection module 230 may select one or more candidate content items for presentation to a viewing user based on the ranking (e.g., by selecting one or more of the highest ranked candidate content items for presentation to the viewing user).

In some embodiments, the online system 140 may receive a request to present a feed of content to a viewing user of the online system 140, in which the feed may include one or more advertisements as well as other types of content items, such as stories describing actions associated with other online system users connected to the viewing user. In such embodiments, the content selection module 230 may access the user profile store 205, the content store 210, the action log 220, and/or the edge store 225 to retrieve information about the viewing user. For example, stories or other data associated with users connected to a viewing user are retrieved. Additionally, one or more content items, such as stories and advertisements, may be retrieved from the content store 210. The retrieved content items are analyzed by the content selection module 230 to identify candidate content items that are likely to be relevant to the viewing user. For example, stories associated with users not connected to a viewing user or stories associated with users for which the viewing user has less than a threshold affinity are discarded as candidate content items. Based on various criteria, the content selection module 230 selects one or more of the candidate content items for presentation to the viewing user. The selected content items are included in a feed of content that is presented to the viewing user. For example, a feed of content may include at least a threshold number of content items describing actions associated with users connected to a viewing user in the online system 140. In embodiments in which the content selection module 230 presents content to a viewing user through a feed, the content selection module 230 also may determine the order in which selected content items are presented via the feed. For example, the content selection module 230 orders content items (e.g., advertisements) in a feed based on likelihoods that a viewing user will interact with the content items. The functionality of the content selection module 230 is further described below in conjunction with FIG. 3.

The media attribute identifier 235 identifies (e.g., as shown in step 315 of FIG. 3) one or more attributes for each item of media ("media attributes") included in a candidate content item identified by the content selection module 230. Examples of media attributes include color saturation, tone, brightness, sharpness, contrast, etc. In some embodiments, media attributes for media included in a candidate content item may be identified by the media attribute identifier 235 using a machine-learning model. In such embodiments, the machine-learning model may identify the media attributes using a neural network or any other suitable media classification algorithm that may be used to analyze visual imagery. For example, the media attribute identifier 235 may identify media attributes for media included in a candidate content item using a machine-learning model (e.g., a convolutional neural network) that analyzes the content of the media. The functionality of the media attribute identifier 235 is further described below in conjunction with FIG. 3.

In some embodiments, the machine-learning module 240 may train a machine-learning model to identify content items maintained in the online system 140 (e.g., in the content store 210) that include media using a convolutional neural network or any other suitable media classification algorithm. For example, the machine-learning module 240 may train a machine-learning model (e.g., a convolutional neural network) to identify content items including media using a training set of content items, in which some of the training set of content items include media and some of the training set of content items do not. In embodiments in which the machine-learning module 240 trains a machine-learning model to identify candidate content items including media using a machine-learning model, the online system 140 also may train the model to identify components of the media included in the identified content items. In the above example, the machine-learning module 240 also may train the model to analyze the content of the media to identify logos, flags, trademarks, emblems, icons, and other components of the media based on a set of training data that includes these components.

In various embodiments, the machine-learning module 240 also may train a machine-learning model to predict a value of a performance metric for a content item and/or a change to the value of the performance metric for the content item. For example, the machine-learning module 240 may train a machine-learning model to predict a click-through-rate or a conversion rate for a content item. In such embodiments, the machine-learning model may be trained based on information associated with content items previously presented to viewing users of the online system 140 (e.g., a call to action associated with each content item, a content of each content item, etc.), media included in the content items, media attributes for the media, user attributes for the viewing users, values of performance metrics associated with previous presentations of content to the viewing users, etc. The functionality of the machine-learning module 240 is further described below in conjunction with FIG. 3.

The performance prediction module 245 predicts (e.g., as shown in step 320 of FIG. 3) a value of a performance metric for a candidate content item including media that indicates a likelihood of user engagement with the candidate content item by a viewing user of the online system 140. Examples of a performance metric include a click-through rate (CTR), a conversion rate, or any other metric indicating a likelihood that a viewing user will interact with a candidate content item in conjunction with being presented with the candidate content item. The performance prediction module 245 may predict a value of a performance metric for a candidate content item based on various factors. Examples of such factors include a content of media included in the candidate content item, media attributes for the media, user attributes for a viewing user (e.g., demographic information and values of one or more performance metrics associated with previous presentations of content to the viewing user), etc. For example, suppose that a candidate content item includes a 360-degree video of a car, in which the 360-degree video of the car has a particular color saturation, tone, brightness, sharpness, and contrast identified by the media attribute identifier 235. In this example, the performance prediction module 245 may predict a CTR performance metric for the candidate content item based on its content, user attributes for a viewing user (e.g., an age and a geographic location) indicating whether the viewing user is likely to have a driver's license, and based on CTR performance metrics for content items associated with cars previously presented to the viewing user that included 360-degree videos or other types of media having a similar color saturation, tone, brightness, sharpness, and contrast as the 360-degree video of the car. In some embodiments, the performance prediction module 245 may predict a value of a performance metric for a candidate content item using a machine-learning model.

For each modification that may be made to a media attribute for media included in a candidate content item, the performance prediction module 245 predicts (e.g., as shown in step 325 of FIG. 3) a change to the value of the performance metric. For example, the performance prediction module 245 may predict a CTR performance metric for a candidate content item including media based on the content of the candidate content item, user attributes for the viewing user, and CTR performance metrics for candidate content items including similar content previously presented to the viewing user that included media having media attributes similar to those of the media included in the candidate content item. In this example, for each modification that may be made to a media attribute for the media (e.g., increasing or decreasing the color saturation by a particular percentage), the performance prediction module 245 also may predict a change to the CTR performance metric. In some embodiments, a modification to a media attribute for media may be achieved through the use of a filter (e.g., a filter that produces a lighting effect, an aging effect, a blurring effect, etc.). In embodiments in which the content selection module 230 identifies a candidate content item including media using a machine-learning model, the online system 140 may determine that the media should not be modified based on one or more policies maintained in the online system 140 and a component of the media identified by the content selection module 230 (e.g., a logo, a flag, a trademark, an emblem, an icon, etc.). In such embodiments, the performance prediction module 245 may not predict a change to the value of the performance metric based on a modification to a media attribute for the media.

In some embodiments, the performance prediction module 245 may predict a change to a value of a performance metric for a candidate content item including media using a machine-learning model. For example, the performance prediction module 245 may provide a set of inputs to a machine-learning model that includes information describing one or more modifications to one or more media attributes for media included in a candidate content item, information associated with the candidate content item (e.g., a call to action associated with the candidate content item, a content of the candidate content item, etc.), and a set of user attributes for a viewing user of the online system 140 to whom the candidate content item may be presented (e.g., actions previously performed by the viewing user in association with being presented with content items having at least a threshold measure of similarity to the candidate content item). In this example, the performance prediction module 245 then receives a set of outputs from the machine-learning model that describe a change to a value of a performance metric previously predicted for the candidate content item. Alternatively, in the above example, the set of outputs from the machine-learning model may correspond to multiple predicted values of the performance metric, in which each predicted value of the performance metric corresponds to each modification to the media attribute(s). In this example, the predicted change to the value of the performance metric may be determined by the performance prediction module 245 as a difference between each predicted value of the performance metric included among the set of outputs and the value of the performance metric previously predicted for the candidate content item.

In some embodiments, the performance prediction module 245 may predict a change to a value of a performance metric for a candidate content item based on multiple combinations of modifications to media attributes for media included in the candidate content item. For example, the performance prediction module 245 may predict a change to a value of a performance metric for a candidate content item by increasing a brightness and a sharpness of a rendering in virtual reality included in the candidate content item while decreasing a color saturation of the rendering. In embodiments in which a candidate content item includes multiple items of media, the performance prediction module 245 may predict a change to a value of a performance metric for the candidate content item based on modifications to one or more media attributes for one or more of the items of media. For example, if a candidate content item includes two images, the performance prediction module 245 may predict a change to a value of a performance metric for the candidate content item based on a modification to a brightness of both images. Alternatively, in the above example, the performance prediction module 245 may predict the change to the value of the performance metric for the candidate content item based on a modification to a brightness of only one of the images. The functionality of the performance prediction module 245 is further described below in conjunction with FIGS. 3, 4A, and 4B.

The optimization module 250 determines (e.g., as shown in step 330 of FIG. 3) an optimal set of media attributes, in which the optimal set of media attributes is associated with a maximum predicted value of the performance metric. For example, the optimization module 250 may determine an optimal set of media attributes for media included in a candidate content item for which the performance prediction module 245 predicted a greatest cumulative increase in the value of the performance metric. In embodiments in which the online system 140 determines that media included in a candidate content item should not be modified based on a component of the media identified by the content selection module 230 and one or more policies maintained in the online system 140, the optimization module 250 may determine that an optimal set of media attributes for the media corresponds to the original media attributes for the media.

In some embodiments, the optimization module 250 may determine an optimal set of media attributes for media included in a candidate content item associated with a maximum predicted value of a performance metric using a machine-learning model. For example, the optimization module 250 may provide a set of inputs to a machine-learning model (e.g., a convolutional neural network) that analyzes the content of media included in a candidate content item. In this example, the set of inputs may include information describing one or more media attributes for the media, information associated with the candidate content item (e.g., a call to action associated with the candidate content item, a content of the candidate content item, etc.), and a set of user attributes for a viewing user of the online system 140 to whom the candidate content item may be presented (e.g., actions previously performed by the viewing user in association with being presented with content items having at least a threshold measure of similarity to the candidate content item). In this example, the optimization module 250 then receives a set of outputs from the machine-learning model that describe an optimal set of media attributes for the media associated with a maximum predicted value of the performance metric. The functionality of the optimization module 250 is further described below in conjunction with FIG. 3.

The media modification module 255 modifies (e.g., as shown in step 335 of FIG. 3) one or more items of media included in a candidate content item based on an optimal set of media attributes for each item of media associated with a maximum predicted value of a performance metric. For example, if the optimization module 250 determines that an optimal set of media attributes corresponding to a 10% increase in a brightness of a video included in a content item and a 15% increase in sharpness of the video are associated with a maximum predicted CTR performance metric, the media modification module 255 may modify the video accordingly. In some embodiments, the media modification module 255 may limit the amount by which one or more media attributes for media included in a candidate content item are modified. For example, the media modification module 255 may modify a color saturation, a tone, a brightness, a sharpness, and a contrast of a 360-degree image by a maximum percentage. In the above example, the maximum percentage by which the 360-degree image may be modified may apply separately to each media attribute for the 360-degree image. Alternatively, in the above example, the maximum percentage by which the 360-degree image may be modified may apply to a total percentage of modifications that may be made to all media attributes for the 360-degree image. In various embodiments, upon modifying media included in a candidate content item, the media modification module 255 may store (e.g., as shown in step 340 of FIG. 3) the candidate content item (e.g., in the content store 210). The functionality of the media modification module 255 is further described below in conjunction with FIG. 3.

The user interface module 260 may generate a user interface including one or more content items to be presented to viewing users of the online system 140. In some embodiments, a user interface generated by the user interface module 260 may include one or more content items selected by the content selection module 230 for presentation to a viewing user of the online system 140. For example, the user interface module 260 may generate a feed of content items (e.g., a newsfeed) that includes one or more content items selected by the content selection module 230, which the online system 140 presents in a display area of a mobile device associated with a viewing user. As an additional example, the user interface module 260 may generate a display unit including a content item that is presented along the right side of a display area of a client device 110 associated with a viewing user of the online system 140. The functionality of the user interface module 260 is further described below in conjunction with FIG. 3.

The web server 265 links the online system 140 via the network 120 to the one or more client devices 110, as well as to the one or more third-party systems 130. The web server 265 serves web pages, as well as other content, such as JAVA®, FLASH®, XML and so forth. The web server 265 may receive and route messages between the online system 140 and the client device 110, for example, instant messages, queued messages (e.g., email), text messages, short message service (SMS) messages, or messages sent using any other suitable messaging technique. A user may send a request to the web server 265 to upload information (e.g., images or videos) that are stored in the content store 210. Additionally, the web server 265 may provide application programming interface (API) functionality to send data directly to native client device operating systems, such as IOS®, ANDROID™, WEBOS® or BlackberryOS.

Figure 3:
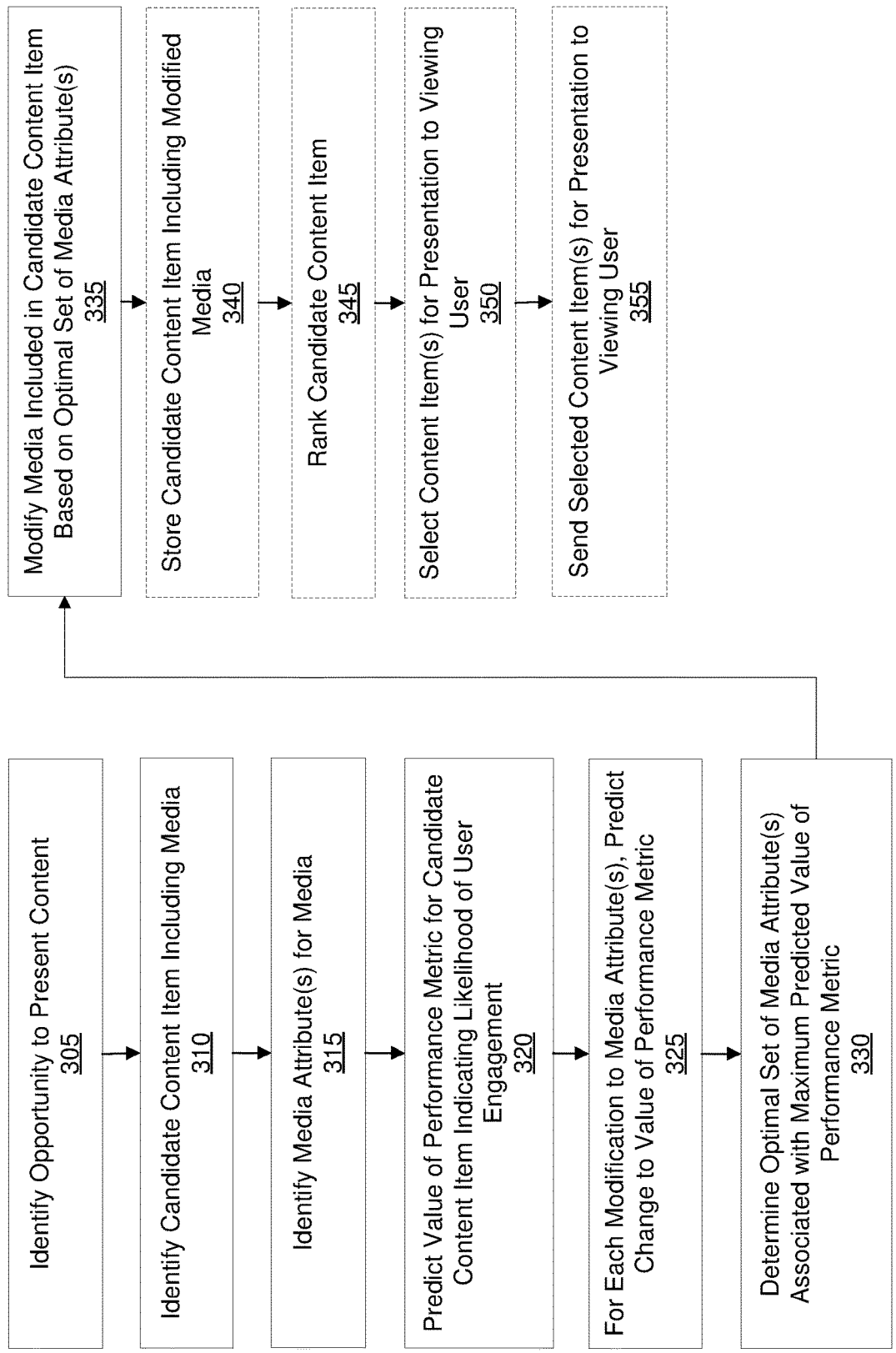
FIG. 3 is a flow chart of a method for optimizing user engagement with content based on an optimal set of attributes for media included in the content, in accordance with an embodiment.

Optimizing User Engagement with Content Based on an Optimal Set of Attributes for Media Included in the Content FIG. 3 is a flow chart of a method for optimizing user engagement with content based on an optimal set of attributes for media included in the content. In other embodiments, the method may include different and/or additional steps than those shown in FIG. 3. Additionally, steps of the method may be performed in a different order than the order described in conjunction with FIG. 3.

The online system 140 identifies 305 an opportunity to present content to a viewing user of the online system 140. For example, the online system 140 may identify 305 an opportunity to present a content item to a viewing user of the online system 140 upon receiving a request from the viewing user to access a user profile page associated with the viewing user maintained in the online system 140, in which the user profile page includes a newsfeed in which various content items may be presented. As an additional example, the online system 140 may identify 305 an opportunity to present a content item to a viewing user of the online system 140 upon receiving a request to present a web page maintained in the online system 140 to the viewing user, in which the web page includes a scrollable unit in which various types of content items may be presented.

Upon identifying 305 the opportunity to present content to the viewing user, the online system 140 identifies 310 (e.g., using the content selection module 230) a candidate content item eligible to be presented to the viewing user, in which the candidate content item includes one or more items of media (e.g., an image, a video, a 360-degree image or video, a rendering in virtual or augmented reality, etc.). The candidate content item may be identified 310 based on targeting criteria associated with the candidate content item that are satisfied by a set of user attributes for the viewing user (e.g., demographic information, interests/hobbies of the viewing user, etc.). In some embodiments, the online system 140 also may identify 310 the candidate content item based on metadata associated with the candidate content item indicating that it includes content having a particular media file format (e.g., JPEG, TIFF, PNG, MOV, AVI, MP4, FLV, WMV, VRML, etc.). The online system 140 also may identify 310 the candidate content item using a machine-learning model trained (e.g., using the machine-learning module 240) to identify one or more items of media included in the candidate content item (e.g., using a convolutional neural network) or using any other suitable technique. In embodiments in which the online system 140 identifies 310 the candidate content item using a machine-learning model, the online system 140 also may use the model to identify components of media included in the candidate content item (e.g., a logo, a flag, a trademark, an emblem, an icon, etc. included in the media).

The online system 140 then identifies 315 (e.g., using the media attribute identifier 235) one or more media attributes for each item of media included in the candidate content item identified 310 by the online system 140. Examples of media attributes include color saturation, tone, brightness, sharpness, contrast, etc. In some embodiments, media attributes for media included in the candidate content item may be identified 315 by the online system 140 using a machine-learning model. In such embodiments, the machine-learning model may identify 315 the media attributes using a convolutional neural network or any other suitable media classification algorithm that may be used to analyze visual imagery.

The online system 140 predicts 320 (e.g., using the performance prediction module 245) a value of a performance metric for the candidate content item that indicates a likelihood of user engagement with the candidate content item by the viewing user. Examples of a performance metric include a click-through rate (CTR), a conversion rate, or any other metric indicating a likelihood that a viewing user will interact with a candidate content item in conjunction with being presented with the candidate content item. The online system 140 may predict 320 the value of the performance metric for the candidate content item based on various factors. Examples of such factors include a content of media included in the candidate content item, media attributes for the media, user attributes for the viewing user (e.g., demographic information and values of one or more performance metrics associated with previous presentations of content to the viewing user), etc. In some embodiments, the online system 140 may predict 320 the value of the performance metric for the candidate content item using a machine-learning model.

Figure 4A:
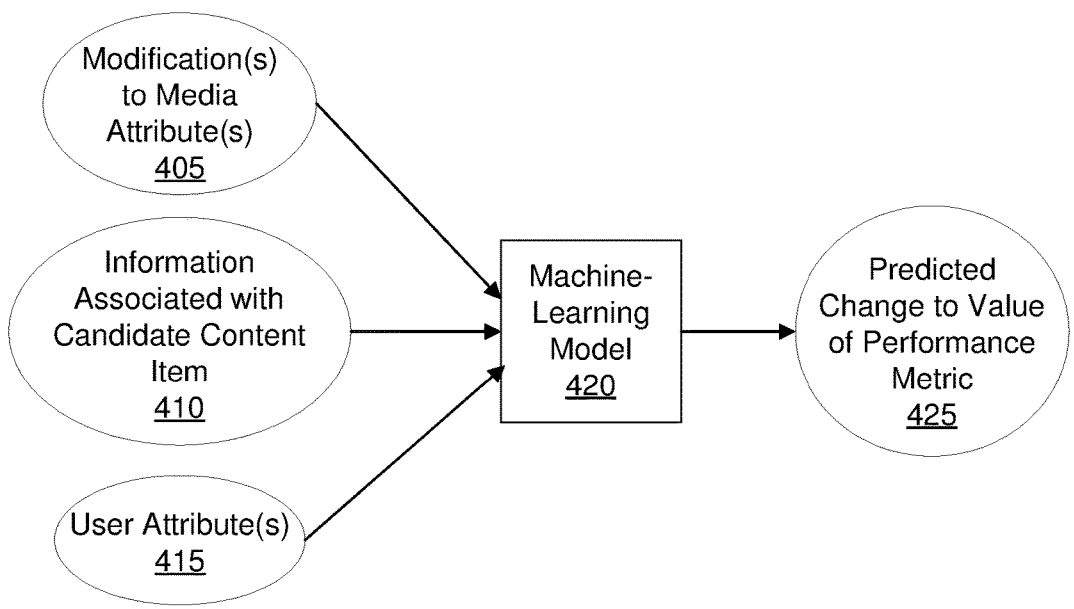
FIG. 4A is a conceptual diagram of predicting a change to a value of a performance metric for a candidate content item using a machine-learning model, in accordance with an embodiment.
Figure 4B:
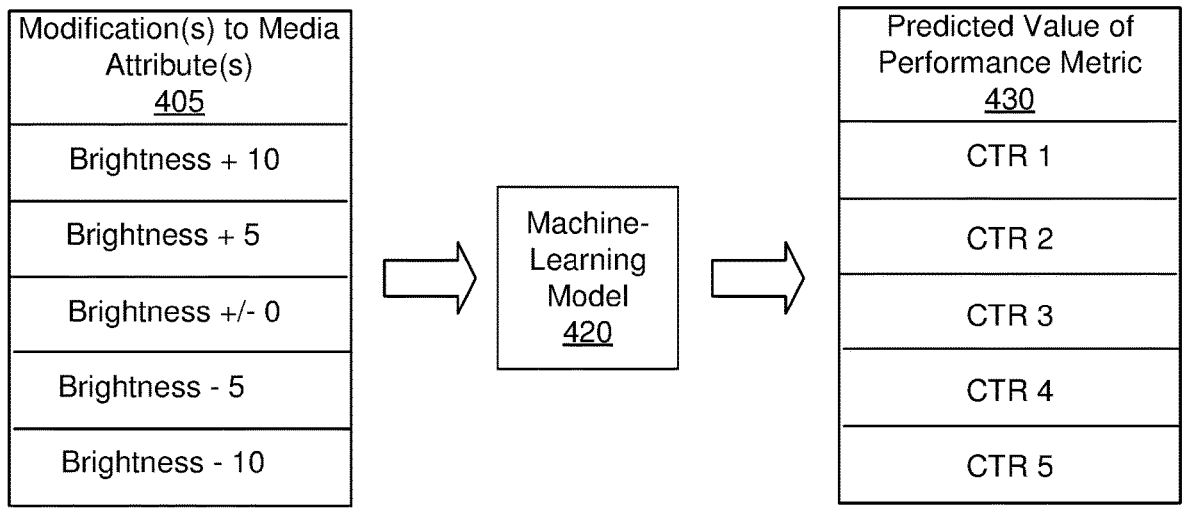
FIG. 4B is a conceptual diagram of predicting a value of a performance metric for a candidate content item using a machine-learning model, in accordance with an embodiment.

For each modification that may be made to a media attribute for media included in the candidate content item, the online system 140 predicts 325 (e.g., using the performance prediction module 245) a change to the value of the performance metric. In some embodiments, the online system 140 may predict 325 the change to the value of the performance metric using a machine-learning model. As shown in the example of FIG. 4A, the online system 140 may provide a set of inputs to a machine-learning model 420 that includes information describing one or more modifications to one or more media attributes 405 for media included in a candidate content item, information associated with the candidate content item 410, and a set of user attributes 415 for a viewing user of the online system 140 to whom the candidate content item may be presented. In this example, the online system 140 then receives a set of outputs from the machine-learning model 420 that describe a predicted change to a value of a performance metric 425 previously predicted 320 for the candidate content item. Alternatively, as shown in the example of FIG. 4B, the set of outputs from the machine-learning model 420 may correspond to multiple predicted values of the performance metric 430 (e.g., CTR 1, CTR 2, CTR 3, CTR 4, and CTR 5), in which each predicted value of the performance metric corresponds to each modification to the media attribute(s) 405. In this example, the predicted change to the value of the performance metric may be determined by the online system 140 as a difference between each predicted value of the performance metric 430 included among the set of outputs and the value of the performance metric previously predicted 320 for the candidate content item.

In some embodiments, the online system 140 may predict 325 the change to the value of the performance metric for the candidate content item based on multiple combinations of modifications to media attributes for one or more items of media included in the candidate content item. In embodiments in which the candidate content item includes multiple items of media, the online system 140 may predict 325 the change to the value of the performance metric for the candidate content item based on modifications to one or more media attributes for one or more of the items of media. Furthermore, in embodiments in which the online system 140 identifies 310 the candidate content item using a machine-learning model, the online system 140 may determine that one or more items of media included in the candidate content item should not be modified based on one or more policies maintained in the online system 140 and a component of the item(s) of media identified by the online system 140 (e.g., a logo, a flag, a trademark, an emblem, an icon, etc.). In such embodiments, the online system 140 may not predict 325 the change to the value of the performance metric based on a modification to a media attribute for the item(s) of media.

Referring back to FIG. 3, the online system 140 determines 330 (e.g., using the optimization module 250) an optimal set of media attributes for one or more items of media included in the candidate content item associated with a maximum predicted value of the performance metric. In embodiments in which the online system 140 determines that media included in the candidate content item should not be modified based on a component of the media identified by the online system 140 and one or more policies maintained in the online system 140, the online system 140 may determine 330 that the optimal set of media attributes for the media corresponds to the original media attributes for the media. In some embodiments, the online system 140 may determine 330 the optimal set of media attributes for media included in the candidate content item using a machine-learning model.

The online system 140 then modifies 335 (e.g., using the media modification module 255) one or more items of media included in the candidate content item based on the optimal set of media attributes for each item of media associated with the maximum predicted value of the performance metric. In some embodiments, the online system 140 may limit the amount by which one or more media attributes for media included in the candidate content item are modified 335. In various embodiments, upon modifying 335 media included in the candidate content item, the online system 140 may store 340 the candidate content item (e.g., in the content store 210).

The online system may then rank 345 (e.g., using the content selection module 230) the candidate content item including the modified media among one or more additional candidate content items for presentation to the viewing user of the online system 140. The online system 140 may rank 345 the candidate content items based on the maximum predicted value of the performance metric associated with the optimal set of media attributes. In some embodiments, the online system 140 also may rank 345 the candidate content items based on additional factors (e.g., a bid amount associated with one or more of the candidate content items, a measure of relevance associated with one or more of the candidate content items, etc.).

The online system 140 may select 350 (e.g., using the content selection module 230) one or more content items for presentation to the viewing user based on the ranking (e.g., by selecting 350 one or more of the highest ranked content items for presentation to the viewing user). Finally, the online system 140 may send 355 the selected content item(s) for presentation to the viewing user. In some embodiments, the online system 140 may send 355 the selected content item(s) for presentation to the viewing user via a user interface (e.g., a feed of content items) generated by the online system 140 (e.g., using the user interface module 260).

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    identifying an opportunity to present content to a viewing user of an online system;
    identifying a candidate content item eligible to be presented to the viewing user, the identified candidate content item comprising media;
    identifying a plurality of media attributes for the media;
    predicting a value of a performance metric for the candidate content item indicating a likelihood of user engagement with the content item by the viewing user, the value of the performance metric predicted based at least in part on the plurality of media attributes for the media;
    for each of a plurality of modifications to the media attributes, predicting a change to the value of the performance metric;
    determining an optimal set of media attributes for the media associated with a maximum predicted value of the performance metric;
    determining a maximum percentage of total modification associated with the plurality of media attributes to be applied to the media comprising the candidate content item, wherein each modification of the plurality of modifications is associated with a change in percentage and a sum of the changes does not exceed the maximum percentage of total modification; and
    modifying the media comprising the candidate content item based at least in part on the determined optimal set of media attributes for the media and the determined maximum percentage.

2. The method of claim 1, further comprising:
    ranking the candidate content item comprising the modified media among a set of candidate content items eligible to be presented to the viewing user, the ranking based at least in part on the maximum predicted value of the performance metric;
    selecting one or more content items for presentation to the viewing user based at least in part on the ranking; and
    sending the one or more content items for presentation to the viewing user.

3. The method of claim 1, wherein one or more of the value of the performance metric and the change to the value of the performance metric are predicted using a machine-learning model.

4. The method of claim 3, wherein the machine-learning model is trained based at least in part on one or more selected from the group consisting of: a plurality of media attributes for a plurality of media included in content previously presented to a plurality of viewing users of the online system, one or more user attributes for the plurality of viewing users of the online system, and a plurality of values of the performance metric associated with previous presentations of the content.

5. The method of claim 3, wherein predicting the change to the value of the performance metric comprises:
    providing a set of inputs to the machine-learning model, the set of inputs comprising information describing the plurality of modifications to the plurality of media attributes for the media, information associated with the candidate content item, and a set of user attributes for the viewing user of the online system; and
    receiving a set of outputs from the machine-learning model, the set of outputs comprising information describing the change to the value of the performance metric.

6. The method of claim 3, wherein the plurality of media attributes for the media comprising the candidate content item are identified by the machine-learning model using a convolutional neural network.

7. The method of claim 1, wherein the plurality of media attributes for the media comprise one or more selected from the group consisting of: a color saturation, a tone, a brightness, a sharpness, and a contrast.

8. The method of claim 1, wherein the plurality of modifications to the plurality of media attributes for the media are achieved using a filter.

9. The method of claim 1, further comprising:
    identifying one or more components comprising the media, wherein the one or more components are selected from the group consisting of: a logo, a flag, a trademark, an emblem, and an icon.

10. The method of claim 9, wherein determining the optimal set of media attributes for the media associated with the maximum predicted value of the performance metric comprises:
    responsive to identifying the one or more components comprising the media, determining the optimal set of media attributes for the media corresponds to the plurality of media attributes for the media.

11. The method of claim 1, wherein the media is selected from the group consisting of: an image, a video, a 360-degree image, a 360-degree video, a rendering in virtual reality, and a rendering in augmented reality.

12. A computer program product comprising a computer readable storage medium having instructions encoded thereon that, when executed by a processor, cause the processor to:
- identify an opportunity to present content to a viewing user of an online system;
- identify a candidate content item eligible to be presented to the viewing user, the identified candidate content item comprising media;
- identify a plurality of media attributes for the media;
- predicting a value of a performance metric for the candidate content item indicating a likelihood of user engagement with the content item by the viewing user, the value of the performance metric predicted based at least in part on the plurality of media attributes for the media;
- for each of a plurality of modifications to the one or more media attributes, predict a change to the value of the performance metric;
- determine an optimal set of media attributes for the media associated with a maximum predicted value of the performance metric;
- determining a maximum percentage of total modification associated with the plurality of media attributes to be applied to the media comprising the candidate content item, wherein each modification of the plurality of modifications is associated with a change in percentage and a sum of the changes does not exceed the maximum percentage of total modification; and
- modify the media comprising the candidate content item based at least in part on the determined optimal set of media attributes for the media and the determined maximum percentage.

13. The computer program product of claim 12, wherein the computer readable storage medium further has instructions encoded thereon that, when executed by the processor, cause the processor to:
- rank the candidate content item comprising the modified media among a set of candidate content items eligible to be presented to the viewing user, the ranking based at least in part on the maximum predicted value of the performance metric;
- select one or more content items for presentation to the viewing user based at least in part on the ranking; and
- send the one or more content items for presentation to the viewing user.

14. The computer program product of claim 12, wherein one or more of the value of the performance metric and the change to the value of the performance metric are predicted using a machine-learning model.

15. The computer program product of claim 14, wherein the machine-learning model is trained based at least in part on one or more selected from the group consisting of: a plurality of media attributes for a plurality of media included in content previously presented to a plurality of viewing users of the online system, one or more user attributes for the plurality of viewing users of the online system, and a plurality of values of the performance metric associated with previous presentations of the content.

16. The computer program product of claim 14, wherein predict the change to the value of the performance metric comprises:
- provide a set of inputs to the machine-learning model, the set of inputs comprising information describing the one or more modifications to the plurality of media attributes for the media, information associated with the candidate content item, and a set of user attributes for the viewing user of the online system; and
- receive a set of outputs from the machine-learning model, the set of outputs comprising information describing the change to the value of the performance metric.

17. The computer program product of claim 14, wherein the plurality of media attributes for the media comprising the candidate content item are identified by the machine-learning model using a convolutional neural network.

18. The computer program product of claim 12, wherein the plurality of media attributes for the media comprise one or more selected from the group consisting of: a color saturation, a tone, a brightness, a sharpness, and a contrast.

19. The computer program product of claim 12, wherein the plurality of media attributes for the media are achieved using a filter.

20. The computer program product of claim 12, wherein the computer readable storage medium further has instructions encoded thereon that, when executed by the processor, cause the processor to:
- identify one or more components comprising the media, wherein the one or more components are selected from the group consisting of: a logo, a flag, a trademark, an emblem, and an icon.

21. The computer program product of claim 20, wherein determine the optimal set of media attributes for the media associated with the maximum predicted value of the performance metric comprises:
- responsive to identifying the one or more components comprising the media, determine the optimal set of media attributes for the media corresponds to the plurality of media attributes for the media.

22. The computer program product of claim 12, wherein the media is selected from the group consisting of: an image, a video, a 360-degree image, a 360-degree video, a rendering in virtual reality, and a rendering in augmented reality.

23. A method comprising:
- identifying an opportunity to present content to a viewing user of an online system;
- identifying a candidate content item eligible to be presented to the viewing user, the identified candidate content item comprising media;
- identifying a plurality of media attributes for the media;
- predicting a value of a performance metric for the candidate content item indicating a likelihood of user engagement with the content item by the viewing user, the value of the performance metric predicted based at least in part on the plurality of media attributes for the media;
- for each of a plurality of modifications to the media attributes, predicting a change to the value of the performance metric;
- determining an optimal set of media attributes for the media associated with a maximum predicted value of the performance metric;
- determining a maximum percentage of total modification associated with the plurality of media attributes to be applied to the media comprising the candidate content item, wherein each modification of the plurality of modifications is associated with a change in percentage and a sum of the changes does not exceed the maximum percentage of total modification; and
- modifying the media comprising the candidate content item based at least in part on the determined optimal set of media attributes for the media and the determined maximum percentage.

24. The method of claim 23, further comprising:
- ranking the candidate content item comprising the modified media among a set of candidate content items eligible to be presented to the viewing user, the ranking based at least in part on the maximum predicted value of the performance metric;
- selecting one or more content items for presentation to the viewing user based at least in part on the ranking; and
- sending the one or more content items for presentation to the viewing user.

25. The method of claim 23, wherein the plurality of media attributes for the media comprise one or more selected from the group consisting of: a color saturation, a tone, a brightness, a sharpness, and a contrast.

26. The method of claim 23, wherein the media is selected from the group consisting of: an image, a video, a 360-degree image, a 360-degree video, a rendering in virtual reality, and a rendering in augmented reality.

\* \* \* \* \*